United States Patent
Kubota et al.

(10) Patent No.: US 6,712,197 B2
(45) Date of Patent: Mar. 30, 2004

(54) BOARD PROCESSING UNIT

(75) Inventors: Hirotoshi Kubota, Shizuoka-ken (JP); Hiroyuki Suzuki, Shizuoka-ken (JP)

(73) Assignee: Heian Corporation, Shizuoka-ken (JP)

( * ) Notice: Subject to any disclaimer, the term of this patent is extended or adjusted under 35 U.S.C. 154(b) by 0 days.

(21) Appl. No.: 10/233,793

(22) Filed: Sep. 3, 2002

(65) Prior Publication Data

US 2003/0234160 A1 Dec. 25, 2003

(30) Foreign Application Priority Data

Jun. 21, 2002 (JP) ........................................ 2002-180827

(51) Int. Cl.$^7$ ..................... B65G 37/00; B65G 15/12; B23C 1/20
(52) U.S. Cl. ................. 198/620; 409/182; 198/626.1; 198/626.2; 198/626.3
(58) Field of Search ............................... 198/620, 626.1, 198/626.2, 626.3, 626.4, 626.5, 626.6; 409/182

(56) References Cited

U.S. PATENT DOCUMENTS

| | | | | |
|---|---|---|---|---|
| 4,949,768 A | * | 8/1990 | Giles et al. ................... 144/4.1 |
| 5,331,874 A | * | 7/1994 | Foster et al. .................. 83/423 |
| 5,640,891 A | * | 6/1997 | Hoffa ........................... 83/155 |
| 6,092,446 A | * | 7/2000 | Hardesty ....................... 82/148 |
| 6,099,212 A | * | 8/2000 | Marocco ....................... 408/3 |
| 6,206,262 B1 | * | 3/2001 | Achelpohl et al. .......... 225/100 |
| 6,216,756 B1 | * | 4/2001 | Mason ..................... 144/248.5 |
| 6,450,752 B1 | * | 9/2002 | Hill ............................ 198/429 |

\* cited by examiner

*Primary Examiner*—Richard Ridley
(74) *Attorney, Agent, or Firm*—Richard M. Goldberg

(57) ABSTRACT

A process board is moved, positioned and processed by first and second upper conveyers and first and second lower conveyers, and a tool of a head is moved between the first upper and lower conveyers and the second upper and lower conveyers such that the first and second upper conveyers and the first and second lower conveyers are not damaged by the tool.

4 Claims, 7 Drawing Sheets

BOARD PROCESSING UNIT

BACKGROUND OF THE INVENTION

The present invention relates to a board process unit without the use of a holder or a supporting board by passing a tool of the board process unit between first upper and lower conveyers and second upper and lower conveyers and by contacting the tool with only the board.

In a prior numerical control unit, a head holding a tool is laterally moved along a beam, and a suction table is longitudinally moved to the moving direction of the head, whereby a process board suctioned on the suction table is processed by the tool of the numerical control unit.

However, in such numerical control unit, when the process board is suctioned on the suction table, and the process board is processed by the tool, the tool may pass through the process board. Therefore, when the process board is directly mounted on the suction table, the suction table is damaged by the tool. To avoid damage to the tool, a supporting board having suction holes which are the same as the suction table is mounted on the suction table, and the process board is mounted on the supporting board. Because the supporting board has the suction holes corresponding to the process board, when a different type of process board is mounted on the supporting board, the supporting board corresponding to the different type of process board must be mounted on the suction table. The work involved in changing the supporting board is troublesome, and the working performance is reduced.

SUMMARY OF THE INVENTION

It is, therefore, the primary object of the present invention to provide a board processing unit by which a process board can be processed without a supporting board.

It is another object of the present invention to provide a board processing unit in which the lower faces of the first and second upper carrying belts are constructed to be flat, the upper faces of the first and second lower carrying belts are constructed to be flat, and a process board is held and passed between the first and second upper carrying belts and the first and second lower carrying belts and is processed by a tool.

In order to accomplish the above and other objects, the present invention comprises a board processing unit including first and second upper conveyers including opposing small rollers having a small diameter, large rollers having a large diameter provided remote from the small rollers, respectively, a plurality of small flat rollers positioned between the small rollers and the large rollers, and belts wound around the small rollers, the large rollers and the plural small rollers; first and second servomotors having pulleys; belts wound around the pulleys and the large rollers of the first and second upper conveyers; first and second lower conveyers including small rollers provided lower than and near the small rollers of the first and second upper conveyers, middle rollers provided remote from the small rollers, large rollers provided lower than the middle rollers, a plurality of upper middle rollers positioned between the small rollers and the middle rollers, and belts wound around the small rollers, the middle rollers and the plural middle rollers; third and fourth servomotors having pulleys; belts wound around the large and middle rollers of the first and second lower conveyers; and first and second gear boxes having ball threads for raising and lowering the first and second upper conveyers, whereby a process board positioned on the first and second lower conveyers is pushed by the first and second upper conveyers lowered by the gear boxes, and the first and second upper conveyers and the first and second lower conveyers are synchronously driven by the first, second, third and fourth servomotors such that a tool attached above the first and second upper conveyers is passed between opposing portions of the first and second upper conveyers and the first and second lower conveyers and the process board is processed by the tool.

DESCRIPTION OF THE PREFERRED EMBODIMENTS

Figure 1:
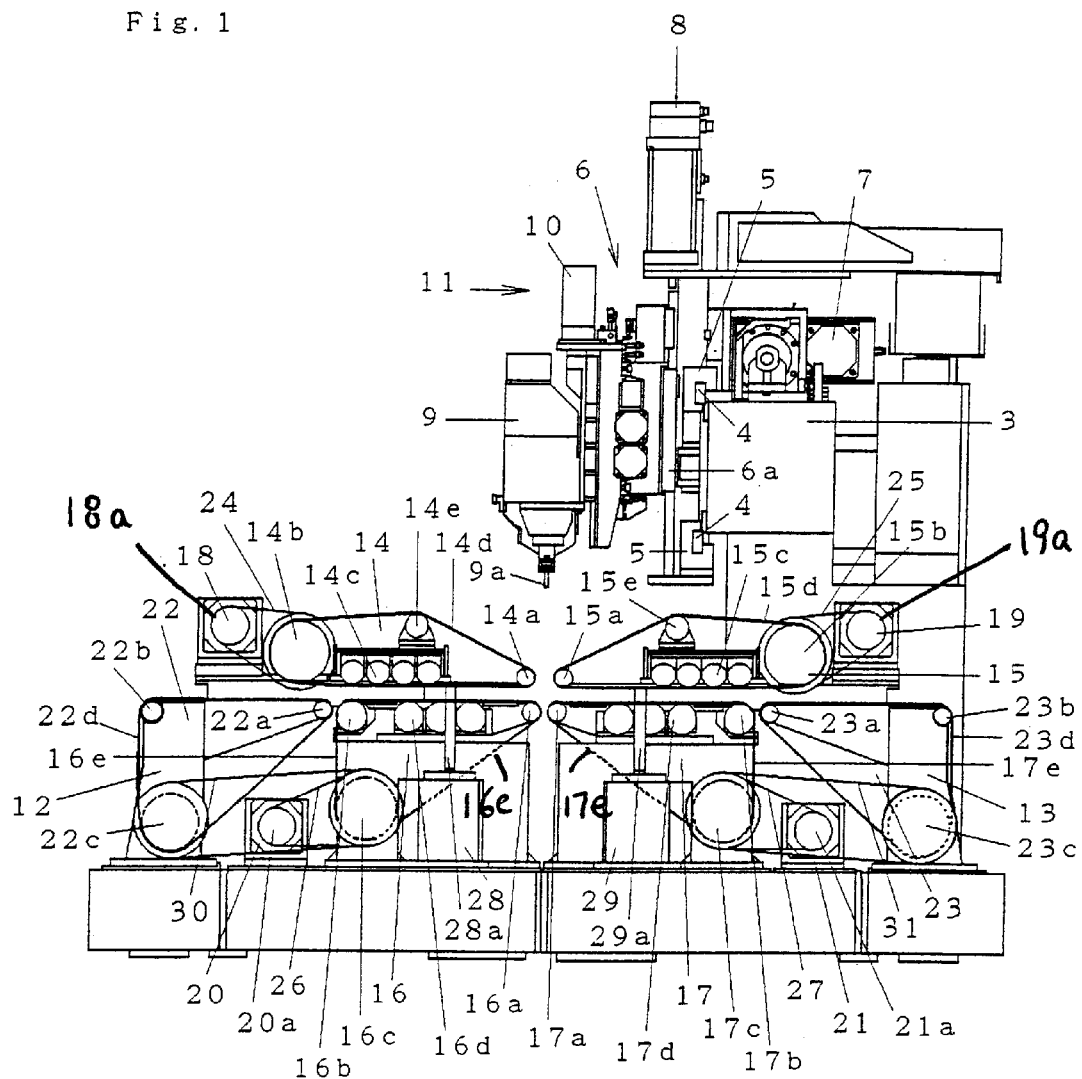
FIG. 1 shows a side elevational view of a board process unit of an embodiment of the present invention.
Figure 2:
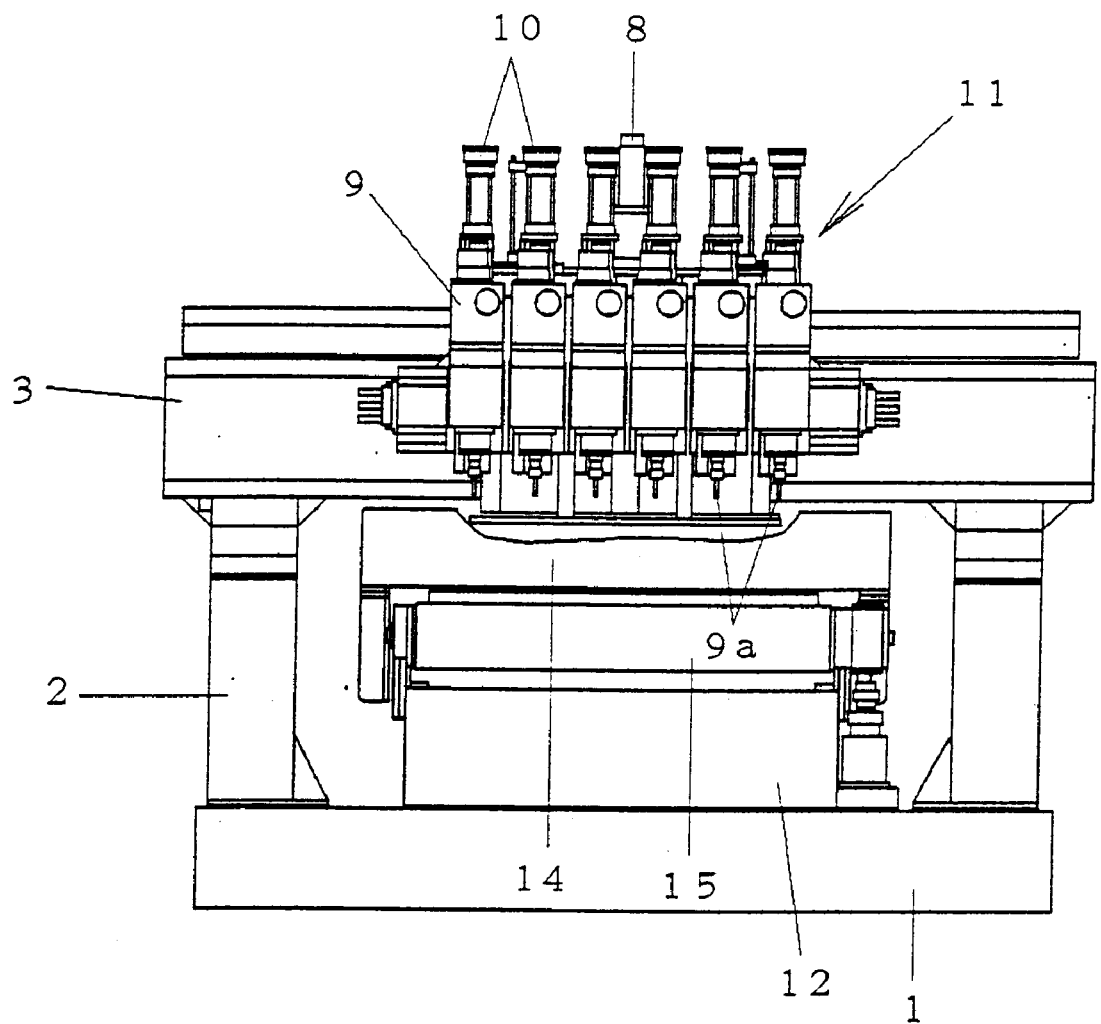
FIG. 2 shows a front elevational view of the board process unit of FIG. 1.
Figure 3:
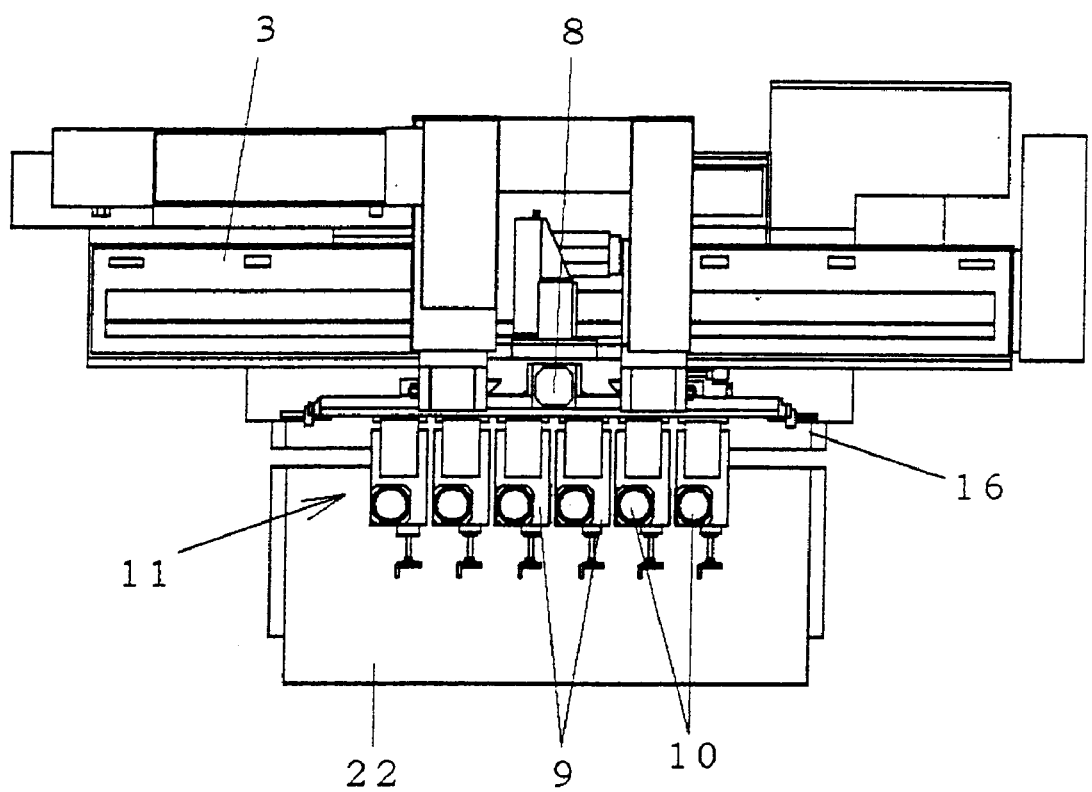
FIG. 3 shows a plan view of the board process unit of FIG. 1.

Referring to FIGS. 1, 2 and 3, in a numerical control router 11, a beam 3 is laterally fixed to an upper portion of support columns 2 fixed on a support base 1. Rails 4 are fixed to the beam 3, and bearings 5 which are engaged with the rails 4 are fixed to a head structure 6 which is moved and positioned by a servomotor 7 mounted on the end of the beam 3. A raising and lowering member 6a mounted on the head structure 6 is moved and positioned to a predetermined position by a servomotor 8. Plural heads 9 are mounted on the raising and lowering member 6a and are lowered to a predetermined position. A cylinder 10 and tools 9a are attached to the plural heads 9, respectively.

Below the numerical control router 11 mounted on the support base 1, a first upper conveyer 14 is mounted on a supporting base 12, a second upper conveyer 15 is mounted on a supporting base 13 in parallel with the first upper conveyer 14, a first lower conveyer 16 is mounted on the support base 1 in a lower portion than the first upper conveyer 14, a second lower conveyer 17 is mounted on the support base 1 in a lower position than the second upper conveyer 15, a first servomotor 18 is provided near the first upper conveyer 14, a second servomotor 19 is provided near the second upper conveyer 15, a third servomotor 20 is provided near the first lower conveyer 16, and a fourth servomotor 21 is provided near the second lower conveyer 17. A carry-in conveyer 22 is provided near the first lower conveyer 16 and a carry-out conveyer 23 is provided near the second lower conveyer 17.

In the first and second conveyers 14 and 15, small rollers 14a and 15a are provided in immediate opposite portions of the first and second upper conveyers 14 and 15, large rollers 14b and 15b are provided in remote positions from the small rollers 14a and 14b, a plurality of small rollers 14c and 15c are provided with a flat lower face between the small rollers 14a and 15a and the large rollers 14b and 15b, belts 14d and 15d are respectively wound on the small rollers 14a and 15a, the large lowers 14*b* and 15*b* and the plural small rollers 14*c* and 15*c*, and tension rollers 14*e* and 15*e* are provided for holding tension in the upper portion of the plural small rollers 14*c* and 15*c*.

In the first and second lower conveyers 16 and 17, small rollers 16*a* and 17*a* are provided in immediate opposite positions of the first and second lower conveyers 16 and 17, middle rollers 16*b* and 17*b* are provided parallel to and remotely positioned with respect to the small rollers 16*a* and 17*a*, large rollers 16*c* and 17*c* are provided in lower positions below the middle rollers 16*b* and 17*b*, a plurality of middle flat rollers 16*d* and 17*d* are provided between the small rollers 16*a* and 17*a* and the middle rollers 16*b* and 17*b*, and belts 16*e* and 17*e* are wound about the small rollers 16*a* and 17*a*, the middle rollers 16*b* and 17*b*, the large rollers 16*c* and 17*c* and the plural flat middle rollers 16*d* and 17*d*.

A belt 24 is wound around the large roller 14*b* of the first upper conveyer 14 and a pulley 18*a* of the first servomotor 18, a belt 25 is wound around the large roller 15*b* of the second upper conveyer 15 and a pulley 19*a* of the second servomotor 19, a belt 26 is wound around the large roller 16*c* of the first lower conveyer 16 and a pulley 20*a* of the third servomotor 20, and a belt 27 is wound around the large roller 17*c* of the second lower conveyer 17 and a pulley 21*a* of the fourth servomotor 21. First and second gear boxes 28 and 29 are provided in the lower position of the plural middle rollers 16*d* and 17*d* of the first and second lower conveyers 16 and 17 to rise and lower the first and second lower conveyers 16 and 17 by ball threads 28*a* and 29*a* of the first and second gear boxes 28 and 29.

In the carry-in conveyer 22 near the first lower conveyer 16, a small roller 22*a* is provided near the middle roller 16*b* of the first lower conveyer 16, a small roller 22*b* is provided parallel to and remotely positioned from the small roller 22*a*, a large roller 22*c* is provided at a lower position below the small roller 22*b*, a belt 22*d* is wound around the small rollers 22*a* and 22*b* and the large roller 22*c*, and the upper face of the belt 22*d* between the small rollers 22*a* and 22*b* is constructed in parallel with the upper face of the first lower conveyer 16.

In the carry-out conveyer 23 near the second lower conveyer 17, a small roller 23*a* is provided near the middle roller 17*b* of the first lower conveyer 17, a small roller 23*b* is provided parallel to and remotely positioned of the small roller 23*a*, a large roller 23*c* is provided at a lower position below the small roller 23*b*, and a belt 23*d* is wound around the small rollers 23*a* and 23*b* and the large roller 23*c*. The upper face of the belt 23*d* between the small rollers 23*a* and 23*b* is constructed in parallel with the upper face of the second lower conveyer 17. A belt 30 is wound around the large roller 16*c* of the first lower conveyer 16 and the large roller 22*c* of the carry-in conveyer 22, and a belt 23 is wound around the large roller 17*c* of the second lower conveyer 17 and the large roller 23*c* of the carry-out conveyer 23.

Figure 4:
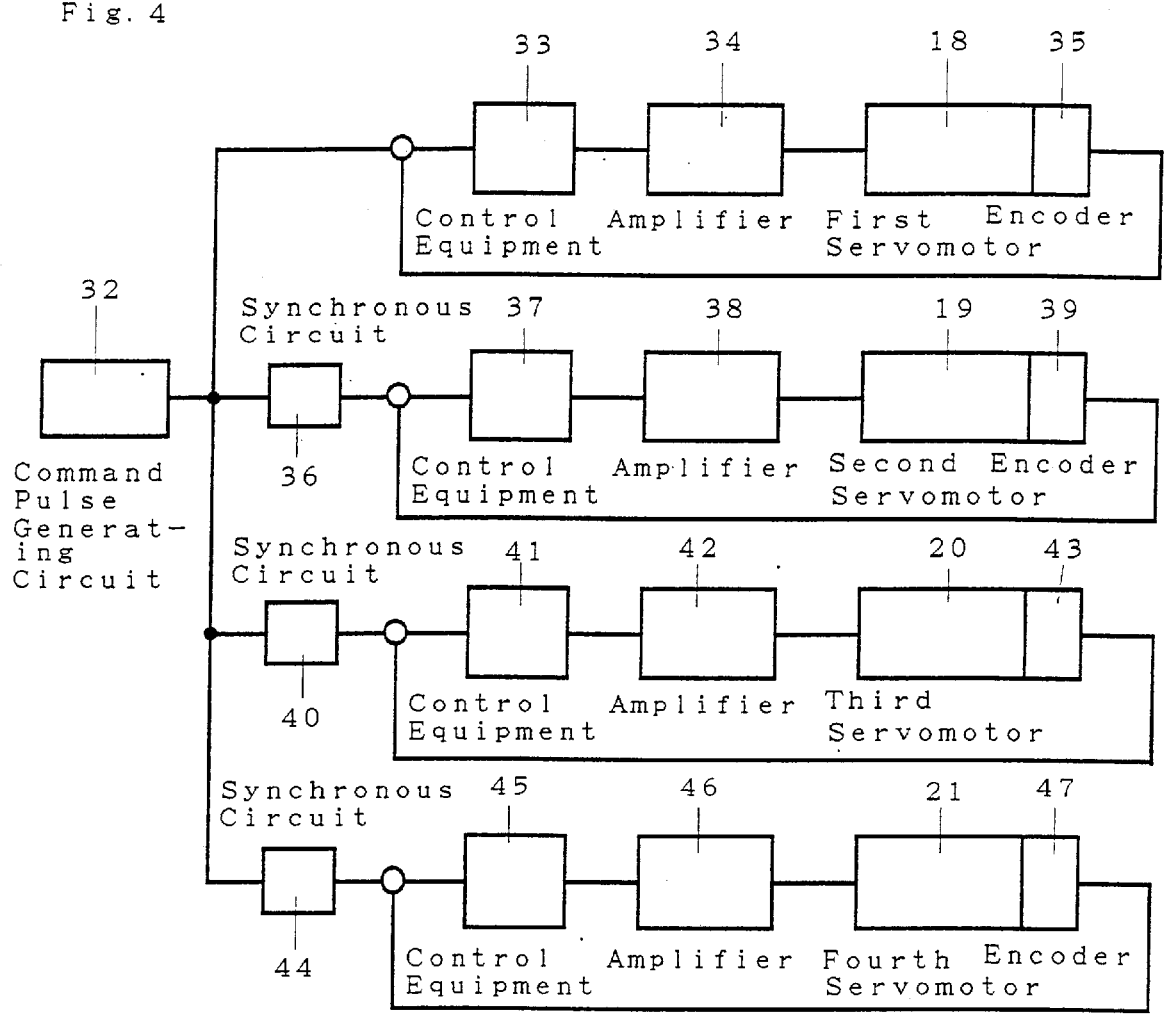
FIG. 4 shows a block diagram of control equipment for first, second, third and fourth servomotors of the board process unit of FIG. 1.

Referring to FIG. 4, in the control equipment, the output of a command pulse generating circuit 32 is supplied to a control circuit 33, the output of the control circuit 33 is supplied to an amplifier 34, the output of the amplifier 34 is supplied to a first servomotor 18, and the output of an encoder 35 attached to the rotating shaft of the first servomotor 18 is fed back to the output of the command pulse generating circuit 32.

The output of the command pulse generating circuit 32 is also supplied to a synchronous circuit 36, the output of synchronous circuit 36 is supplied to a control circuit 37, the output of the control circuit 37 is supplied to an amplifier 38, the output of the amplifier 38 is supplied to a second servomotor 19, and the output of an encoder 39 attached to the rotating shaft of the servomotor 19 is supplied to the output of synchronous circuit 36.

The output of the command pulse generating circuit 32 is also supplied to a synchronous circuit 40, the output of synchronous circuit 40 is supplied to a control circuit 41, the output of the control circuit 41 is supplied to in an amplifier 43, the output of the amplifier 43 is supplied to a third servomotor 20, and the output of an encoder 43 attached to the rotating shaft of the servomotor 20 is supplied to the output of synchronous circuit 40.

The output of the command pulse generating circuit 32 is also supplied to a synchronous circuit 44, the output of synchronous circuit 44 is supplied to a control circuit 45, the output of the control circuit 45 is supplied to an amplifier 46, the output of the amplifier 46 is supplied to a fourth servomotor 21, and the output of an encoder 47 attached to the rotating shaft of the servomotor 21 is supplied to the output of synchronous circuit 44.

In the control equipment, when command pulses from the command pulse generating circuit 32 are supplied to the control circuit 33, the output of the control circuit 33 is amplified by the amplifier 34 and is supplied to the first servomotor 18, and pulses proportional to the rotating number of the first servomotor 18 which are generated from the encoder 35 and are fed back to the output of the command pulse generating circuit 32 and are subtracted from the command pulses, whereby the first servomotor 18 is rotated by the subtracted command pulses.

When command pulses from the command pulse generating circuit 32 are supplied to the synchronous circuit 36, synchronous command pulses multiplied by a coefficient k1 are generated by the synchronous circuit 36 to synchronize the second servomotor 19 with the rotation number of the first servomotor 18. The synchronous command pulses are supplied to the control circuit 37, the output of the control circuit 37 is amplified by the amplifier 38 and is supplied to the second servomotor 19, and pulses proportional to the rotating number of the second servomotor 19 which are generated from the encoder 39 and are supplied to the output of the synchronous circuit 36 and are subtracted from the synchronous command pulses from the synchronous circuit 36, whereby the second servomotor 19 is controlled and rotated to synchronize with the rotation number of the first servomotor 18 by the subtracted command pulses.

When command pulses from the command pulse generating circuit 32 are supplied to the synchronous circuit 40, synchronous command pulses multiplied by a coefficient k2 are generated from the synchronous circuit 40 to synchronize the third servomotor 20 with the rotation number of the first servomotor 18. The synchronous command pulses are supplied to the control circuit 41, the output of the control circuit 41 is amplified by the amplifier 42 and is supplied to the third servomotor 20, and pulses proportional to the rotating number of the third servomotor 20 which are generated from the encoder 43 and are fed back to the output of the synchronous circuit 40 and are subtracted from the synchronous command pulses from the synchronous circuit 40, whereby the third servomotor 20 is controlled and rotated to synchronize with the rotation number of the first servomotor 18 by the subtracted command pulses.

When command pulses from the command pulse generating circuit 32 are supplied to the synchronous circuit 44, synchronous command pulses multiplied by a coefficient k3 are generated from the synchronous circuit 44 to synchronize the fourth servomotor 21 with the rotation number of the first servomotor 18. The synchronous command pulses are supplied to the control circuit 45, the output of the control circuit 45 is amplified by the amplifier 46 and is supplied to the fourth servomotor 21, and pulses proportional to the rotating number of the fourth servomotor 21 which are generated from the encoder 47 are fed back to the output of the synchronous circuit 44 and are subtracted from the synchronous command pulses from the synchronous circuit 44, whereby the fourth servomotor 21 is controlled and rotated to synchronize with the rotation number of the first servomotor 18 by the subtracted command pulses.

As stated above, in the above board process unit of the present embodiment, when the process board is carried from the carry-in conveyer 22 between the first upper conveyer 14 and the first lower conveyer 16, the first gear box 28 is driven by a servomotor (not shown), and the process board is pushed by the first upper conveyer 14 lowered by the ball thread 28a. When the first upper conveyer 14 and the first lower conveyer 16 are driven by the first and third servomotors 18 and 20, the process board is then carried between the second upper and lower conveyers 15 and 17, the gear box 29 is driven by a servomotor (not shown), the second upper conveyer 15 is lowered by the ball thread 29a, and the process board is positioned between the second upper and lower conveyers 15 and 17. Then, the first, second, third and fourth servomotors 18, 19, 20 and 21 are controlled and driven to synchronize with the rotation number of the first servomotor 18, and the process board is positioned by the first, second, third and fourth servomotors 18, 19, 20 and 21 and is processed by the tool 9a of the head 9 passed through the opposing portions between the first upper and lower conveyers 14 and 16 and the second upper and lower conveyers 15 and 17.

Therefore, because the tool 9a of the head 9 does not contact the belts 14d and 15d of the first and second upper conveyers 14 and 15 and the belts 16e and 17e of the first and second lower conveyers 16 and 17, the belts 14d, 15d 16e and 17e are not damaged by the tool 9a of the head 9, and the support board for supporting the process board is not need.

Figure 5:
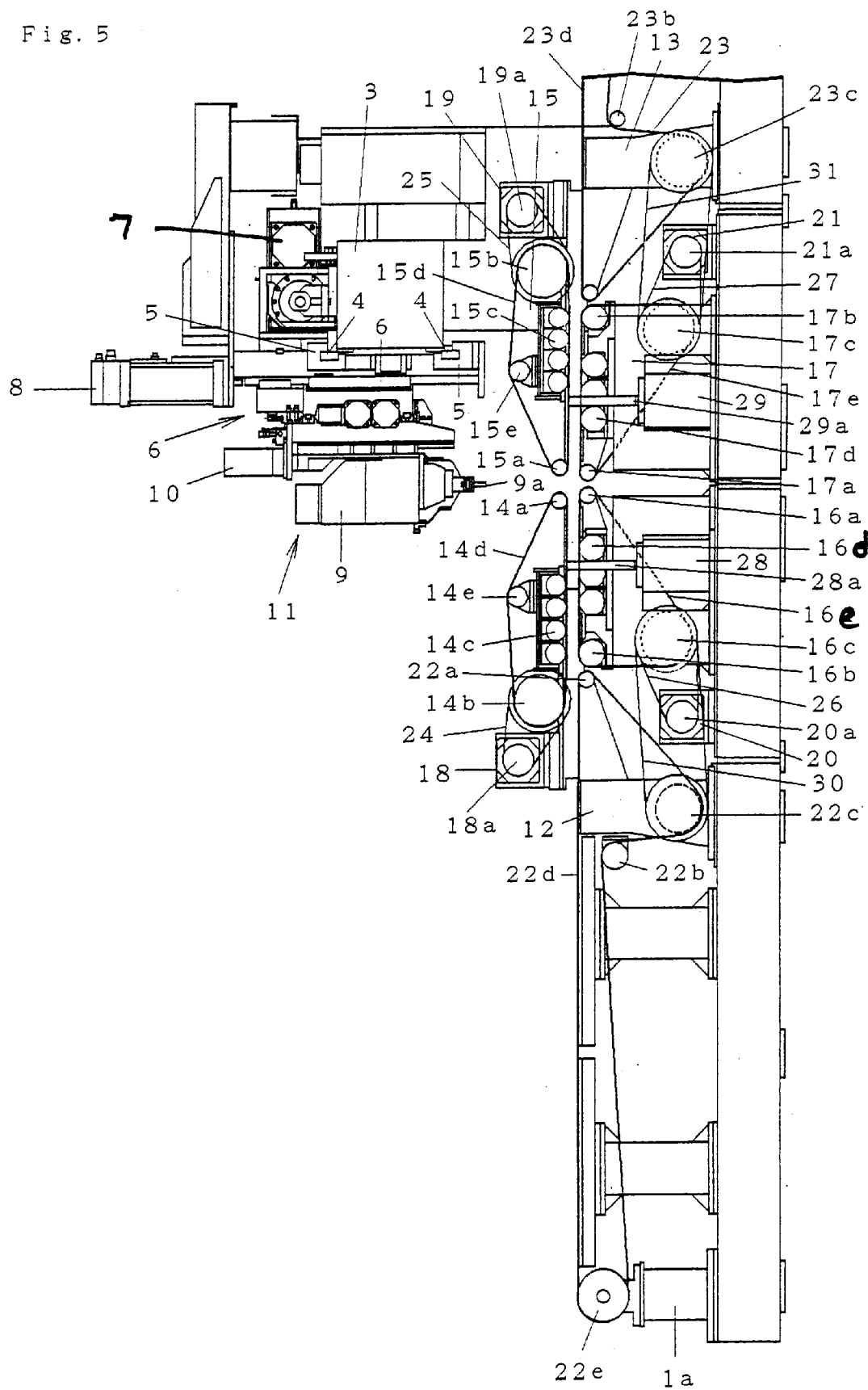
FIG. 5 shows a side elevational view of a board process unit of another embodiment of the present invention.

Referring to FIG. 5, there are provided a support base (not numbered), support columns (not numbered), a beam 3, rails 4, bearings 5, a head structure 6, a servomotor 7, a servomotor 8, plural heads 9, a cylinder 10, a numerical control router 11, support bases 12 and 13, a first upper conveyer 14, a second upper conveyer 15, a first lower conveyer 16, a second lower conveyer 17, a first servomotor 18, a second servomotor 19, a third servomotor 20, a fourth servomotor 21, a first gear box 28, and a second gear box 19, and these elements are the same as those in the above embodiment in FIG. 1 and an explanation of these elements is thereby omitted. In the carry-in conveyer 22, a large roller 22e is provided on a support base 1a at a remote position from the small roller 22a, the small roller 22b is provided at a lower position than the large roller 22e, the belt 22d is wound the small rollers 22a and 22b and the large rollers 22c and 22e, and the carry-out conveyer 23 (not shown) is constructed the same as the carry-in conveyer 22.

In the embodiment in FIG. 5, when a long process board is processed, the process board is not bent, is not curved and is continuously processed.

In the above embodiments, although the process board is processed by the numerical control router, the process board is processed by another process machine.

In the above embodiment, although the carry-in conveyer 22 and the carry-out conveyer 23 are respectively separated from the first and second lower conveyers 16 and 17, the carry-in conveyer 22 and the first lower conveyer 16 are constructed as a unity construction whereby the belt 16e of the first lower conveyer 16 is wound around the small roller 22b and the large roller 22c of the carry-in conveyer 22, and the carry-out conveyer 23 and the second conveyer 17 are constructed as a unity construction whereby the belt 17e of the second lower conveyer 17 is wound around the small roller 23b and the large roller 23c of the carry-out conveyer 23.

Figure 6:
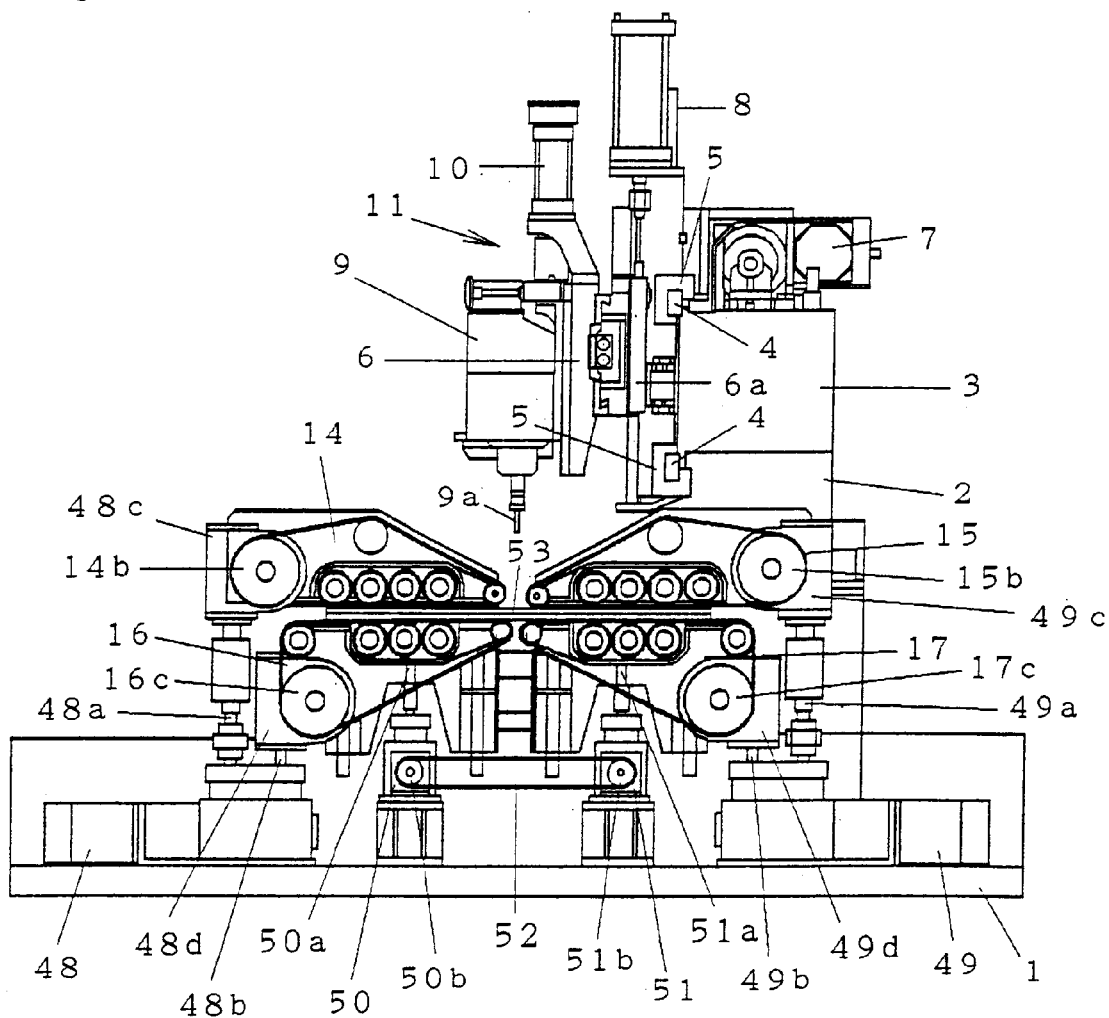
FIG. 6 shows a side elevational view of a board process unit of another embodiment of the present invention.

Referring to FIG. 6, there are provided a support base 1, support columns 2, a beam 3, rails 4, bearings 5, a head structure 6, a servomotor 7, a servomotor 8, plural heads 9, a cylinder 10, a numerical control router 11, support bases 12 and 13, a first upper conveyer 14, a second upper conveyer 15, a first lower conveyer 16, a second lower conveyer 17, and these elements are constructed the same as those in the above embodiment in FIG. 1 and an explanation of these elements is omitted. Instead of the first, second, third and fourth servomotors 18, 19, 20 and 21, first and second servomotors 48 and 49 are used, the rotary shafts 48a and 48b of the first servomotor 48 are respectively connected with rotation converters 48c and 48d which are jointed to the rotation shafts of the large rollers 14b and 16c of the first upper and lower conveyers 14 and 16, and the rotary shafts 49a and 49b of the second servomotors 49 are respectively connected with rotation converters 49c and 49d which are jointed to the rotation shafts of the large rollers 15c and 17c of the second upper and lower conveyers 15 and 17.

Raising and lowering equipment 50 having a raising and lowering servomotor (not shown) is placed in a lower position of the first lower conveyer 16, raising and lowering equipment 51 is placed in a lower position of the second lower conveyer 17 in a space with the raising and lowering equipment 50, rotary shafts 50a and 51a of the raising and lowering equipment 50 and 51 are constructed to move the first and second upper conveyers 14 and 15 up and down, synchronous pulleys 50b and 51b are provided on the raising and lowering equipment 50 and 51, a belt 52 is wound the synchronous pulleys 50b and 51b, and the rotation of the raising and lowering equipment 50 is transmitted to the rising and lowering equipment 51.

In such embodiment, after the space between the first and second upper conveyers 14 and 15 and the first and second lower conveyers 16 and 17 is regulated to the thickness of the process board 53, the process board 53 is inserted between the first upper conveyer 14 and the first lower conveyer 16, and the first and second servomotors 48 and 49 are synchronously driven, whereby the first and second upper conveyers 14 and 15 and the first and second lower conveyers 16 and 17 are driven.

When the process board 53 is moved between the first and second upper conveyers 14 and 15 and between the first and second lower conveyer 16 and 17, the numerical control router 11 is driven, the head structure 6 is moved along the beam 3 by the servomotor 7, the raising and lowering member 6a of the head structure 6 is lowered to a predetermined position by the servomotor 8, the head 9 mounted on the raising and lowering member 6a is lowered to a predetermined position by the cylinder 10, the tool 9a mounted on the head 9 is lowered between the opposing portions of the first and second upper conveyers 14 and 15 and the first and second lower conveyers 16 and 17, and the process board 53 at the opposite portions is processed by the tool.

The process board 53 is moved and positioned by the first and second upper conveyers 14 and 15 and the first and second lower conveyers 16 and 17, and the tool 9a is moved and positioned to the opposite positions between the first and second upper conveyers 14 and 15 and the first and second lower conveyers 16 and 17 and processes the process board 53. Therefore, the first and second upper conveyers 14 and 15 and the first and second lower conveyers 16 and 17 are not damaged by the tool 9a, and any support board for supporting the process board 53 is not needed.

Figure 7:
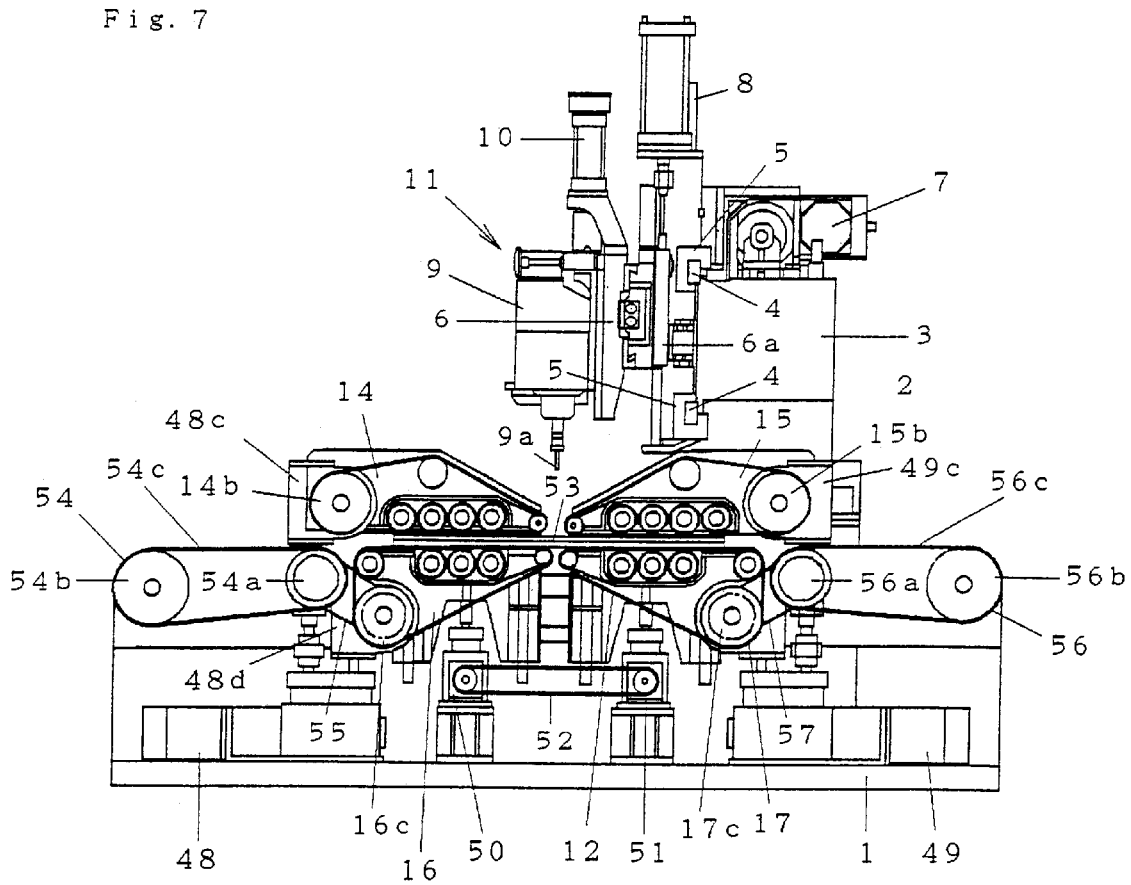
FIG. 7 shows a front elevational view of the board process unit of FIG. 6.

Referring to FIG. 7, there are provided a support base 1, support columns 2, a beam 3, rails 4, bearings 5, a head structure 6, a servomotor 7, a servomotor 8, plural heads 9, a cylinder 10, a numerical control router 11, support bases 12 and 13, a first upper conveyer 14, a second upper conveyer 15, a first lower conveyer 16, a second lower conveyer 17, a first servomotor 48, a second servomotor 49, raising and lowering equipment 50 and 51, a belt 52, and a process board 53, and these elements are the same as those in the above embodiment in FIG. 1 and an explanation of these elements is omitted. In this embodiment, a carry-in conveyer 54 is provided near the first upper and lower conveyers 14 and 16 and includes a driven roller 54a, a rotary roller 54b and a belt 54c wound around the rollers 54a and 54b, and a timing belt 55 is wound around the driven roller 54a and the large roller 16c of the first lower conveyer 16. A carry-out conveyer 56 is provided near the second lower conveyer 17 and is constituted by a driven roller 56a, rotation roller 56b and a belt 56c wound around the rollers 56a and 56b, and a timing belt 57 is wound the driven roller 56a of the carry-out conveyer 56 and the large roller 17c of the second lower conveyer 17.

Because the carry-in conveyer 54 and the carry-out conveyer 56 are provided in parallel with the first and second lower conveyers 16 and 17, the carry-in and carry-out of the process board 53 are easy and work efficiency is improved.

What is claimed is:

1. A board process unit comprising:
   a first upper conveyer including:
      a first roller having a first diameter,
      a second roller having a second diameter larger than the first diameter and provided remote from the first roller,
      a plurality of third rollers positioned in-line between the first roller and the second roller, and
      a belt wound around the first roller, the second roller and the plural third rollers,
   a second upper conveyer including:
      a fourth roller having a third diameter and in opposing relation to the first roller,
      a fifth roller having a fourth diameter larger than the third diameter and provided remote from the fourth roller,
      a plurality of sixth rollers positioned in-line between the fourth roller and the fifth roller, and
      a belt wound around the fourth roller, the fifth roller and the plural sixth rollers,
   a first servomotor having a pulley,
   a second servomotor having a pulley,
   a belt wound around the pulley of the first servomotor and the second roller of the first upper conveyer,
   a belt wound around the pulley of the second servomotor and the fifth roller of the second upper conveyer,
   a first lower conveyer including:
      a seventh roller provided lower than and adjacent the first roller of the first upper conveyer,
      an eighth roller provided remote from the seventh roller,
      a ninth roller provided lower than the eighth roller,
      a plurality of upper tenth rollers positioned between the seventh roller and the eighth roller, and
      a belt wound around the seventh roller, the eighth roller and the plural tenth rollers,
   a second lower conveyer including:
      an eleventh roller provided lower than and adjacent the fourth roller of the second upper conveyer,
      a twelfth roller provided remote from the eleventh roller,
      a thirteenth roller provided lower than the twelfth roller,
      a plurality of upper fourteenth rollers positioned between the eleventh roller and the twelfth roller, and
      a belt wound around the eleventh roller, the twelfth roller and the plural fourteenth rollers,
   a third servomotor having a pulley,
   a fourth servomotor having a pulley,
   a belt wound around the pulley of the third servomotor and the ninth roller of the first lower conveyer,
   a belt wound around the pulley of the fourth servomotor and the thirteenth roller of the second lower conveyer,
   a gear box which lowers the first upper conveyor such that a process board positioned on the first lower conveyer is pushed by the first upper conveyer,
   a gear box which lowers the second upper conveyor such that a process board positioned on the second lower conveyer is pushed by the second upper conveyer,
   wherein the first and second upper conveyers and the first and second lower conveyers are synchronously driven by the first, second, third and fourth servomotors, and a tool attached above upper portions of the first and second upper conveyers is passed between opposing portions of the first and second upper conveyers and the first and second lower conveyers for processing of the process board.

2. A board process unit as set forth claim 1, further comprising:
   a carry-in conveyer provided adjacent the first lower conveyer and including a fifteenth roller,
   a carry-out conveyer provided adjacent the second lower conveyer and including a sixteenth roller,
   a belt wound around the fifteenth roller of the carry-in conveyer and the ninth roller of the first lower conveyer,
   a belt wound around the sixteenth roller of the carry-out conveyer and the thirteenth roller of the second lower conveyer, and
   the carry-in conveyer, the carry-out conveyer, and the first and second lower conveyers are synchronously driven by the first, second, third and fourth servomotors.

3. A board process unit as set forth claim 1, wherein the gear boxes include ball threads for raising and lowering the first and second upper conveyers.

4. A board process unit as set forth claim 1, wherein the carry-in conveyer and the carry-out conveyer are respectively constructed; in an elongated manner.

* * * * *